(12) United States Patent
Blanchard

(10) Patent No.: US 8,197,368 B2
(45) Date of Patent: Jun. 12, 2012

(54) TRANSMISSION SYSTEM FOR A SELF-PROPELLED VEHICLE WITH VARIABLE TRAVEL SPEED, ITS CONTROL DEVICE, AND VEHICLE EQUIPPED WITH SUCH A TRANSMISSION SYSTEM

(75) Inventor: Robert Blanchard, Le Boupere (FR)

(73) Assignee: France Reducteurs, Les Herbiers (FR)

( * ) Notice: Subject to any disclaimer, the term of this patent is extended or adjusted under 35 U.S.C. 154(b) by 613 days.

(21) Appl. No.: 11/347,277

(22) Filed: Feb. 6, 2006

(65) Prior Publication Data

US 2006/0183582 A1   Aug. 17, 2006

(51) Int. Cl.
*F16H 59/06* (2006.01)
*G05G 9/02* (2006.01)

(52) U.S. Cl. ............. 474/23; 474/1; 474/38; 74/473.19; 74/478

(58) Field of Classification Search .................... 474/23, 474/1–7, 29, 40; 74/491, 471 XY, 473.1, 74/473, 473.15, 473.16, 473.19, 473.3, 473.33, 74/473.36, 478
See application file for complete search history.

(56) References Cited

U.S. PATENT DOCUMENTS

| 3,298,239 | A | * | 1/1967 | Miyoshi | 474/1 |
| 3,362,242 | A | * | 1/1968 | Watkins | 474/15 |
| 3,370,485 | A | * | 2/1968 | Carawan | 475/211 |
| 3,796,275 | A | * | 3/1974 | Bouyer | 180/6.4 |
| 4,301,902 | A | * | 11/1981 | Gatsos et al. | 192/219 |
| 4,492,271 | A | * | 1/1985 | Doering | 172/43 |
| 4,567,786 | A | * | 2/1986 | Sakurai | 74/483 R |
| 4,771,856 | A | * | 9/1988 | Hutchison et al. | 180/333 |
| 5,497,847 | A | * | 3/1996 | Ota et al. | 180/333 |
| 6,526,846 | B1 | * | 3/2003 | Duppong et al. | 74/564 |
| 2002/0032088 | A1 | * | 3/2002 | Korenjak et al. | 474/14 |
| 2004/0102267 | A1 | * | 5/2004 | Murakami et al. | 474/69 |
| 2005/0056112 | A1 | * | 3/2005 | Mandou | 74/491 |

\* cited by examiner

*Primary Examiner* — Robert A Siconolfi
*Assistant Examiner* — Anna Momper
(74) *Attorney, Agent, or Firm* — Young & Thompson

(57) ABSTRACT

A system for a self-propelled vehicle with variable travel speed, such as a mowing tractor, includes, between the primary driving shaft of the vehicle and an output shaft, such as the wheel drive shaft of the vehicle, at least one controlled variable speed drive with a belt and controlled mechanism for reversing the direction of travel of the vehicle, the primary driving shaft transmitting, via the variable speed drive, its motion to the input shaft of the reversal mechanism, itself able to directly or indirectly engage the output shaft, such as the wheel drive shaft of the vehicle, in such a way as to allow the vehicle to travel forward or in reverse respectively, at a variable travel speed. This transmission system is characterized in that the variable speed drive and the mechanism for reversing the direction of travel of the vehicle are controlled selectively from the same control device.

27 Claims, 17 Drawing Sheets

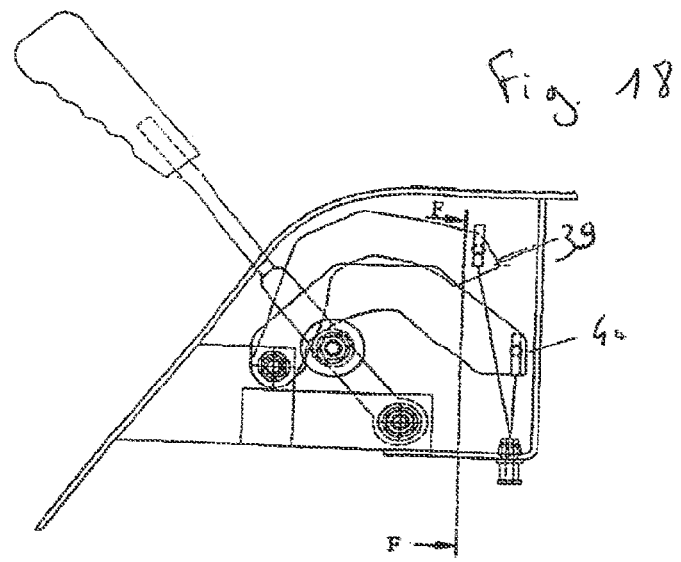
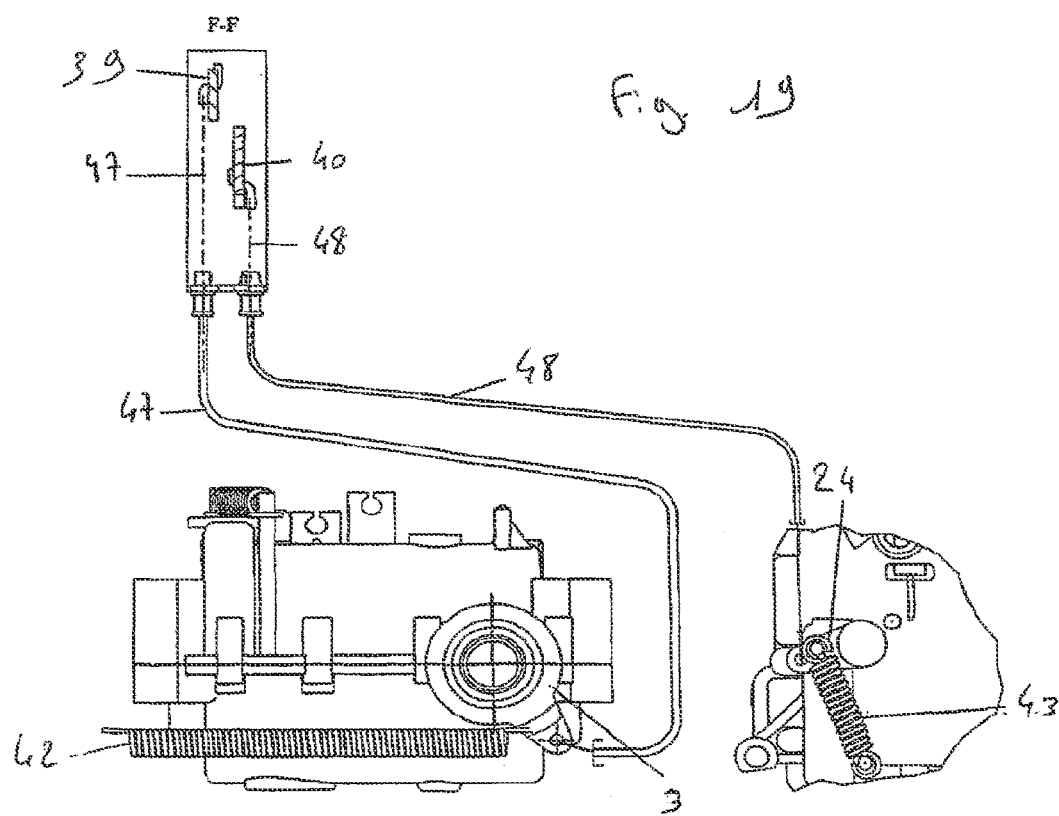

TRANSMISSION SYSTEM FOR A SELF-PROPELLED VEHICLE WITH VARIABLE TRAVEL SPEED, ITS CONTROL DEVICE, AND VEHICLE EQUIPPED WITH SUCH A TRANSMISSION SYSTEM

BACKGROUND OF THE INVENTION

1. Field of the Invention

This invention relates to a transmission system for a self-propelled vehicle with variable travel speed, such as a mowing tractor, its control device as well as a vehicle equipped with such a transmission system.

2. Description of the Related Art

It relates more particularly to a transmission system for a self-propelled vehicle with variable travel speed of the type comprising, between the primary driving shaft of the vehicle and an output shaft, such as the wheel drive shaft of the vehicle, at least one controlled variable speed drive with a belt and a controlled mechanism for reversing the direction of travel of the vehicle, the primary driving shaft transmitting, via the variable speed drive, its motion to the input shaft of the reversal mechanism, itself able to directly or indirectly engage with an output shaft, such as the wheel drive shaft of the vehicle, in such a way as to allow movement forward or in reverse respectively, at a variable travel speed.

Small self-propelled vehicles of the mowing tractor or snowplow type have been extensively developed commercially during recent years. Generally, such self-propelled vehicles are equipped, on the one hand, with a control device for changing the speed, and, on the other hand, with a control device for reversing the direction of travel of the vehicle, these control devices being separate control devices. For the operator, this results in the necessity of manipulating, on the one hand, the direction reversal control device when he wishes to reverse the direction of the vehicle, on the other hand, the speed changing control device when he wishes to change the speed of the vehicle. The presence of two differentiated control devices can lead, in certain cases, to operator handling errors when the order of actuating the different control devices is not observed. If the self-propelled vehicle is equipped with a nonprogressive clutch mechanism or mechanisms, in case of a mishandling by the operator, violent jerking, or even the risk of breaking the transmission, results when the direction is reversed. To avoid such problems, at present self-propelled vehicles are for the most part equipped with a progressive-type clutch mechanism or mechanisms. This leads to an increase in the cost of such vehicles.

SUMMARY OF THE INVENTION

One purpose of this invention is thus to propose a transmission system whose design allows the speed to be changed progressively, both when travelling forward and in reverse, within a wide range, linked to enhanced steering of the vehicle without the risk of mishandling by the operator, especially during operations of reversing the direction of travel of the vehicle.

Another purpose of this invention is to propose a transmission system whose design allows control of the reversal of the direction of travel of the vehicle without jerking, including when the clutch or clutches equipping the transmission of the vehicle are of the nonprogressive type.

For this purpose, the object of the invention is a transmission system for a self-propelled vehicle with variable travel speed, such as a mowing tractor, this system comprising, between the primary driving shaft of the vehicle and an output shaft, such as the wheel drive shaft of the vehicle, at least one controlled variable speed drive with a belt and a controlled mechanism for reversing the direction of travel of the vehicle, the primary driving shaft transmitting, via the variable speed drive, its motion to the input shaft of the reversal mechanism, itself able to directly or indirectly engage with the output shaft, such as the wheel drive shaft of the vehicle, in such a way as to allow the vehicle to travel forward or in reverse respectively, at a variable travel speed in at least one direction of travel, preferably in the two directions of travel of the vehicle, characterized in that the variable speed drive and the mechanism for reversing the direction of travel of the vehicle are controlled selectively from the same control device.

Due to the presence of one control device that is shared by the variable speed drive and the mechanism for reversing the direction of travel of the vehicle, any risk of mishandling by an operator when operating the clutch control and the control for reversing the direction of travel of the vehicle is avoided.

The driving of the vehicle by the operator is facilitated by the latter's needing to manipulate only a single control device for controlling both the change of speed and the reversal of the direction of the vehicle. In this way, a reversal of the direction of movement of the vehicle without jerking is obtained, although said transmission nevertheless allows the speed to be changed within a wide range.

According to one preferred embodiment of the invention, the variable speed drive with a belt of the type comprised of at least one belt transmission between at least one drive pulley and one driven pulley that can each be mounted on a shaft is controlled in operation by a speed changing control device that includes at least one disengaged position in which any transmission of motion from the shaft that bears a drive pulley to another shaft that bears a driven pulley of the variable speed drive is prevented, so as to ensure, specifically, reversal of the direction of travel of the vehicle without jerking when the variable speed drive is in the disengaged position.

The object of the invention is also a transmission system control device of the aforementioned type, this system comprising at least, between a driving shaft and an output shaft, such as a wheel shaft or a tool shaft, on the one hand a variable speed drive formed by a belt transmission, the speed being changed by the flanges of one of the pulleys being moved toward one another or apart from one another in a controlled manner, and on the other hand a reversing gear of the direction of rotation of the output shaft, the reversal being obtained as a result of generally angular movement of one control device such as a fork, characterized in that the control device has the form of a single selector lever, with manual control, generally by foot or hand, this lever that is mounted to be able to pivot around at least one axis acting by at least one motion transmission element, on the one hand on the reversing gear control device, and on the other hand on the control device of the variable speed drive in order to simplify the driving of the vehicle by the user.

The object of the invention is also a self-propelled vehicle with a variable traveling speed of the type equipped with a transmission system comprising, between the primary driving shaft of the vehicle and an output shaft, such as the wheel drive shaft of the vehicle, at least one controlled variable speed drive with a belt and a controlled mechanism for reversing the direction of travel of the vehicle, the primary driving shaft transmitting, via the variable speed drive, its motion to the input shaft of the reversal mechanism, itself able to directly or indirectly engage with the output shaft, such as the wheel drive shaft of the vehicle, in such a way as to allow the vehicle to travel forward or in reverse respectively at a variable travel speed, characterized in that the transmission system is of the aforementioned type.

BRIEF DESCRIPTION OF THE DRAWING FIGURES

The invention will be better understood by reading the following description of embodiments with reference to the attached drawings in which:

FIG. 18 shows a front view of the device from FIG. 14 in a position of the lever corresponding to the control of the forward travel at maximum speed of the vehicle;

FIG. 19 shows a cutaway view along F-F from FIG. 18, the linkage to the variable speed drive and the reversing gear having been shown;

DETAILED DESCRIPTION OF THE PREFERRED EMBODIMENTS

Figure 1:
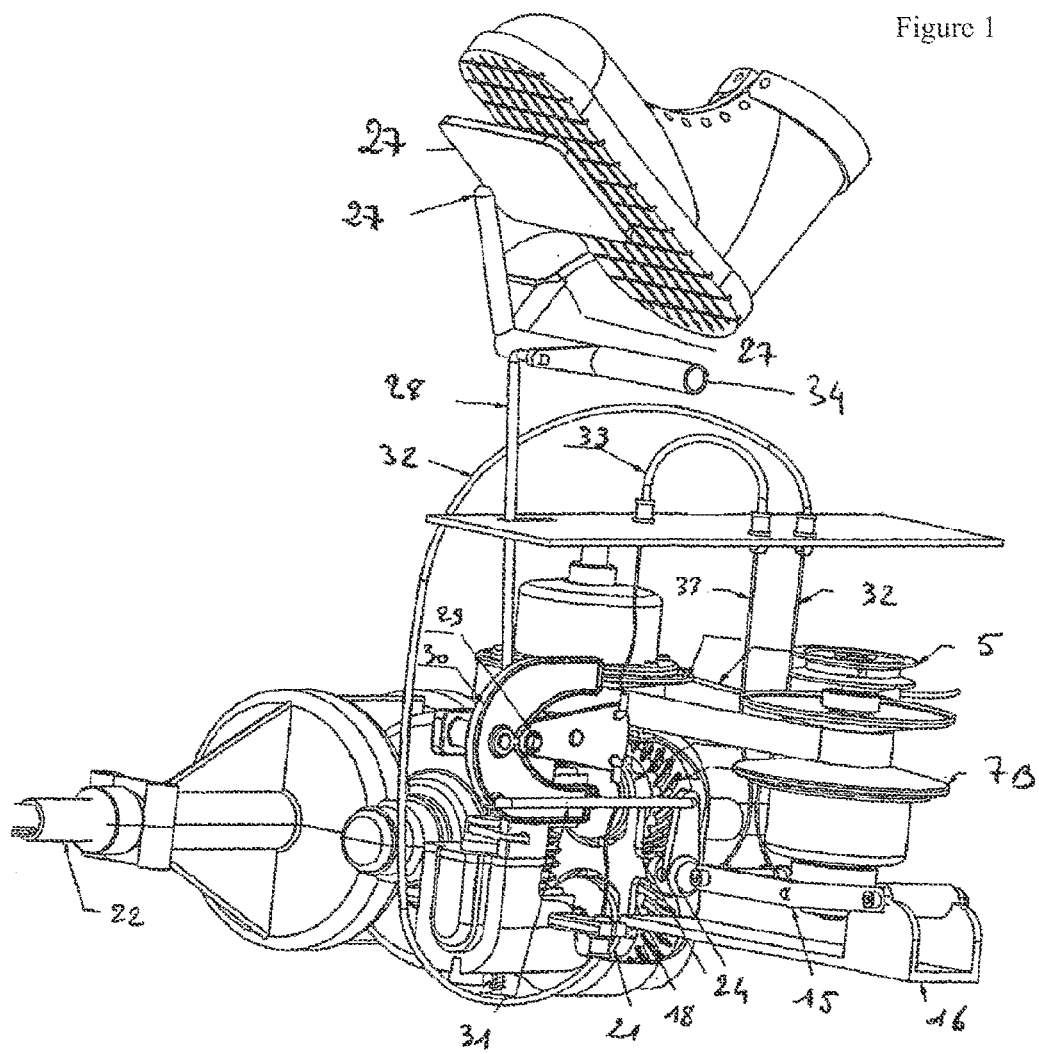
FIG. 1 shows a partial perspective view of a transmission system according to the invention, one part of the housing having been removed, in the disengaged position of the variable speed drive and in the neutral position of the direction reversal mechanism.

As mentioned above, the transmission system for the self-propelled vehicle with variable travel speed, the object of the invention, comprises, between the primary driving shaft 1 of the vehicle and an output shaft 2, such as the wheel drive shaft of the vehicle, at least one variable speed drive 3 with a belt 9 controlled by a control device 15 and a mechanism 17 for reversing the direction of travel of the vehicle controlled by a control device 24. As FIG. 12 illustrates, the primary driving shaft 1, which in the case of a mowing tractor also bears the cutting blade, transmits its motion via variable speed drive 3 to the input shaft 11 of the reversal mechanism 17, itself able to directly or indirectly engage with the output shaft 2, such as the wheel drive shaft of the vehicle, in such a way as to allow the vehicle to travel forward or in reverse respectively, at a variable travel speed.

As mentioned above and in a manner characteristic of the invention, the variable speed drive 3 and the mechanism 17 for reversing the direction of travel of the vehicle are selectively controlled from the same control device 27, 35, comprised here of a foot control such as a pedal shown more particularly in FIGS. 1 to 6.

The variable speed drive 3 with a belt is of the type formed by at least one belt transmission 9 between at least one drive pulley 7 and one driven pulley 8 that can each be mounted on a shaft 10, 11. The operation of this variable speed drive 3 is controlled by a speed changing control device 15 that includes at least one disengaged position in which any transmission of motion from the shaft 10 that bears a drive pulley 7 to another shaft 11 that bears a driven pulley 8 of the variable speed drive 3 is prevented, so as to ensure in particular reversal of the direction of travel of the vehicle without jerking when the variable speed drive 3 is in the disengaged position.

Figure 12:
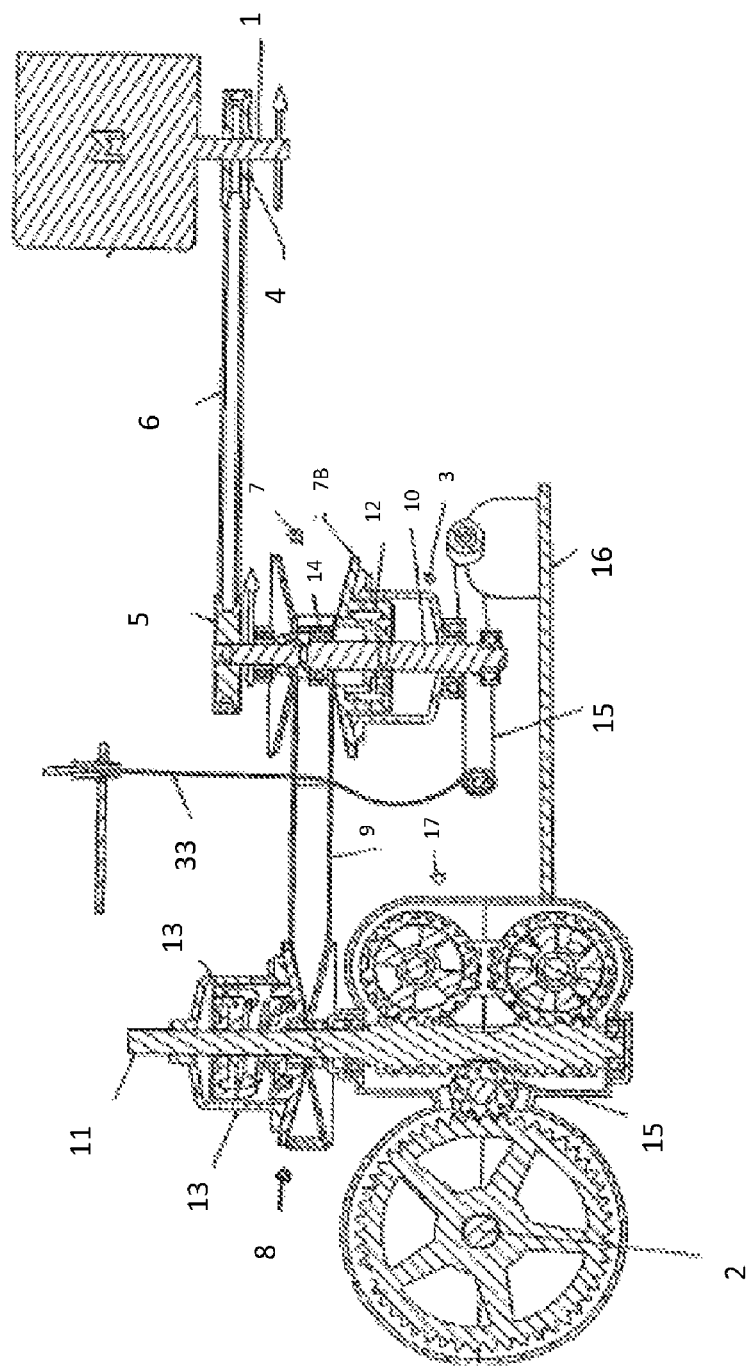
FIG. 12 shows a partial diagrammatic cutaway view of a transmission system according to the invention.

In the example shown in FIG. 12, this variable speed drive 3 with a belt comprises two belt transmissions. The first transmission is located between primary driving shaft 1, corresponding to the engine output shaft of the vehicle, and a shaft labeled 10 in the figures. A pulley 4 is mounted on the primary driving shaft 1 and transmits its motion via a belt 6 to a driven pulley 5 mounted on a shaft 10. This shaft 10 bears a second pulley labeled 7 in the figures. This pulley comprises the drive pulley of a second belt transmission between the shaft 10 and a shaft 11 comprising, in the particular case of FIG. 12, the input shaft of the mechanism for reversal of the direction of the vehicle. The drive pulley 7 that is carried by the shaft 10 is connected via a belt 9 to a pulley 8, i.e., the driven pulley, carried by the shaft 11 comprising the input shaft of the mechanism 17 for reversal of the direction of the vehicle. Thus, the speed is changed more particularly by the belt transmission 9 between the drive pulley 7 and the driven pulley 8.

As mentioned above, the change of speed is obtained by the flanges of at least one of the pulleys being moved toward one another or apart from one another. Actually, the variable speed drive 3 comprises at least two pulleys 7, 8 with flanges, the flanges of at least one of the pulleys having a variable gap. In the example of the pulley labeled 7 in the figures, the flange 7B is a flange that can move at least axially on the shaft 10, this flange 7B being able to move toward or away from the other flange of the pulley 7 mounted in a fixed manner on shaft 10. This same pulley 7 is a so-called controlled pulley because the flanges of said pulley can be moved toward one another or moved apart from one another by the control device 15 for changing the speed of the variable speed drive 3. This speed changing control device 15, which is pivotally mounted on a yoke 16, interacts with an idle element 14 such as a bearing, roller or ring with a surface mounted so as to be able to rotate freely on the shaft 10 that bears the controlled pulley 7 and around which the belt 9 runs at least partially in the position in which the flanges of the controlled pulley 7 have been moved apart, so as to prevent any transmission of motion between shafts 10, 11 bearing the pulleys 7, 8. The movable flange 7B of the controlled pulley 7 just covers the idle element 14 as the flanges of said pulley 7 are moved together in order to allow the belt 9 to run inside the groove provided by the flanges and to enable the variable speed drive 3 to pass from a disengaged position to an engaged position, the continuation of the movement of the flanges of the controlled pulley 7 toward one another allowing the speed to be changed at will. It is noted that when the speed changing control machine 15 is not prompted, the speed drive is returned to the disengaged position, the flange 7B moving away from the other flange of pulley 7 under the action of its own weight.

FIG. 12 illustrates the variable speed drive in a disengaged position. It is apparent that the movement of the flange 7B toward the fixed flange of the pulley 7 makes it possible to cover the idle element 14 and consequently to allow driving of the belt 9 and the transmission of the motion of the shaft 10 that bears pulley 7 to pulley 8 that is carried by shaft 11. To cover the idle element 14, the flange 7B is provided in the center with a housing that is able to accommodate said element 14.

In such a variable speed drive, the flanges of one pulley moving toward one another causes the flanges of the other pulley to move apart and vice versa when the other pulley is likewise a pulley with flanges with a variable gap.

A loading device can also be provided on each pulley that makes it possible to apply an axial force in the direction in which said flanges move toward one another to tighten the belt. This loading device that is composed of, for example, a spring and/or inclined ramps is labeled 12 and 13 in the figures. It will not be described in further detail below.

In the example shown, the controlled pulley 7, whose flanges are controlled as they are moved toward one another or apart from one another by the speed changing control device 15, is the drive pulley of said variable speed drive 3. An equivalent solution could have been obtained by installing the speed changing control device on the driven pulley that is labeled 8 in the figures.

In the same way, an example of the clutch mechanism of the speed drive has been described here. However, this clutch mechanism of the variable speed drive could have been replaced by a tension system of one of the belts 6, 9 of the variable speed drive, this solution sometimes being more difficult to implement.

Finally, the variable speed drive could have been able, in an equivalent manner, to integrate a relay pulley composed of a flange that can move between two fixed flanges, the speed being changed by altering the position of the movable flange.

In the embodiment shown in FIG. 12, the shaft 11 that bears the driven pulley 8 of the variable speed drive comprises the input shaft of the reversal mechanism 17. This reversal mechanism 17 comprises at least two counter-rotating toothed wheels 18, 19 or drive gears that are accommodated within a housing and that engage with the input shaft 11 of said reversing gear 17. Each wheel 18, 19 or drive gear is mounted to be able to rotate freely on a shaft 22, 23, said drive shaft of the vehicle in forward travel and/or reverse travel of said vehicle respectively. Each wheel 18, 19 can be coupled to said shaft 22, 23 via a clutch mechanism 20, 21 that can pass from a disengaged position into an engaged position under the action of a control device comprising the device 24 for control of the reversal of the direction of the reversal mechanism 17.

In the examples shown, the clutch mechanism 20, 21 between the drive shaft 22, 23 of the vehicle and the toothed wheel 18, 19 is a nonprogressive mechanism, preferably with a positive clutch. This clutch mechanism can be shared by said wheels 18, 19, or can be differentiated, i.e., separate for each wheel 18, 19. In the examples shown, this clutch mechanism is differentiated.

Figure 8:
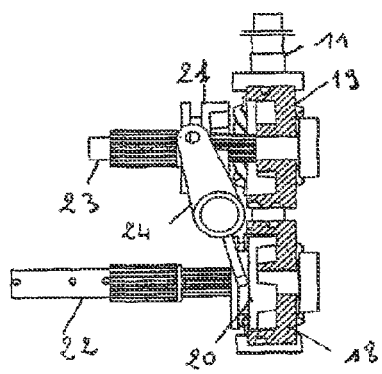
FIGS. 8 to 10 show, in the form of cutaway views, the direction reversal mechanism in the engaged forward travel position (FIG. 8), in the neutral position (FIG. 9) and in the reverse travel engaged position (FIG. 10)

Thus, in this particular embodiment, the input shaft of the reversal mechanism 17 is composed of a worm in a tangential arrangement with two toothed wheels 18, 19 that are each carried by a shaft 22, 23, said drive shaft of the vehicle, the shaft 22 driving the vehicle forward, whereas the shaft 23 drives the vehicle in reverse. The worm 11 is constantly engaged with the toothed wheels 18, 19 to drive them rotationally in opposite directions of rotation. Each toothed wheel is provided with a clutch mechanism with a positive clutch labeled 20 for the toothed wheel 18 and labeled 21 for the toothed wheel 19. Each clutch mechanism can move from a disengaged position in which the positive clutch has been moved away from the toothed wheel to an engaged position in which the positive clutch engages with the teeth provided radially within the toothed wheel, under the action of a control device comprising the control device 24 for reversing the direction of the reversal mechanism 17. This direction reversal control device 24 here has the form of a fork comprising two sets of teeth 25, 26 that each, depending on the angular position assumed by the fork, work with the clutch mechanism 20, 21 to allow one of the clutch mechanisms 20, 21 to pass from an engaged position to a disengaged position and vice versa. These sets of teeth 25, 26 are shaped to act asynchronously on the corresponding clutch mechanism 20, 21. Thus, FIG. 8 shows the control device 24 for reversing the direction in a position in which it moves the positive clutch 20 of the toothed wheel 18 closer such that the positive clutch and the toothed wheel are meshed, making the shaft 22 rotate integrally with the toothed wheel 18, whereas the positive clutch 21 that is designed to work with the toothed wheel 19, itself carried by the drive shaft 23 in reverse motion of the vehicle, is moved away from the toothed wheel 19 to prevent any transmission of motion from the toothed wheel 19 to the shaft 23.

Figure 9:
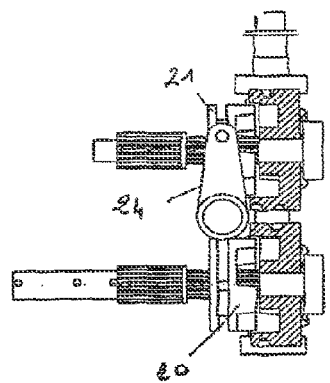

FIG. 9 shows the direction reversal mechanism in a neutral position in which none of the clutch mechanisms with a positive clutch 20, 21 that are shown engages with a toothed wheel 18 and 19.

Figure 10:
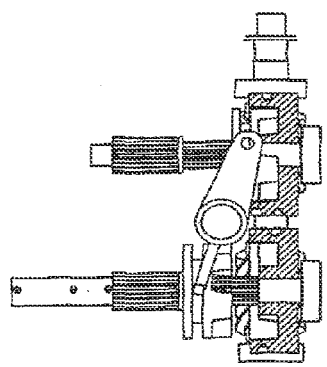
Figure 11:
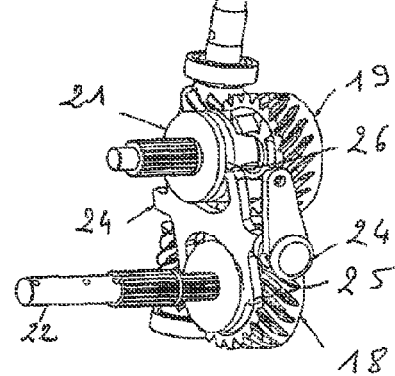
FIG. 11 shows a perspective view in the engaged position in forward movement of the reversal mechanism shown in FIG. 8.

FIG. 10 shows the direction reversal mechanism in a position in which the toothed wheel 19 and the drive shaft 23 in reverse travel of the vehicle are made to rotate integrally via the clutch mechanism with the positive clutch 21, whose teeth engage with teeth carried by the toothed wheel 19.

As mentioned above, at the level of the reversal mechanism 17, a single clutch mechanism could have been provided that is able to engage alternately with one or the other of the toothed wheels or drive gears. Thus, it is also possible to envisage a reversal mechanism 17 in which the input shaft of the reversal mechanism, composed here of a worm, is replaced by a bevel gear, this bevel gear permanently engaging with two bevel gears comprising the equivalents of the toothed wheels 18, 19, these bevel gears being mounted to be able to rotate freely on the same shaft and being rotationally driven in opposite directions by the input bevel gear. A sliding positive clutch can be placed on the shaft that bears the drive gears between said drive gears in such a way as to travel axially on said shaft under the action of the direction reversal control device and to alternately engage one or the other of said bevel gears and to make one of said drive gears rotate integrally with the shaft that bears said drive gears. This solution constitutes a solution that is equivalent to the one described above. Regardless of the solution adopted, the reversal control device 24 is each time an element that can be moved angularly.

Figure 3:
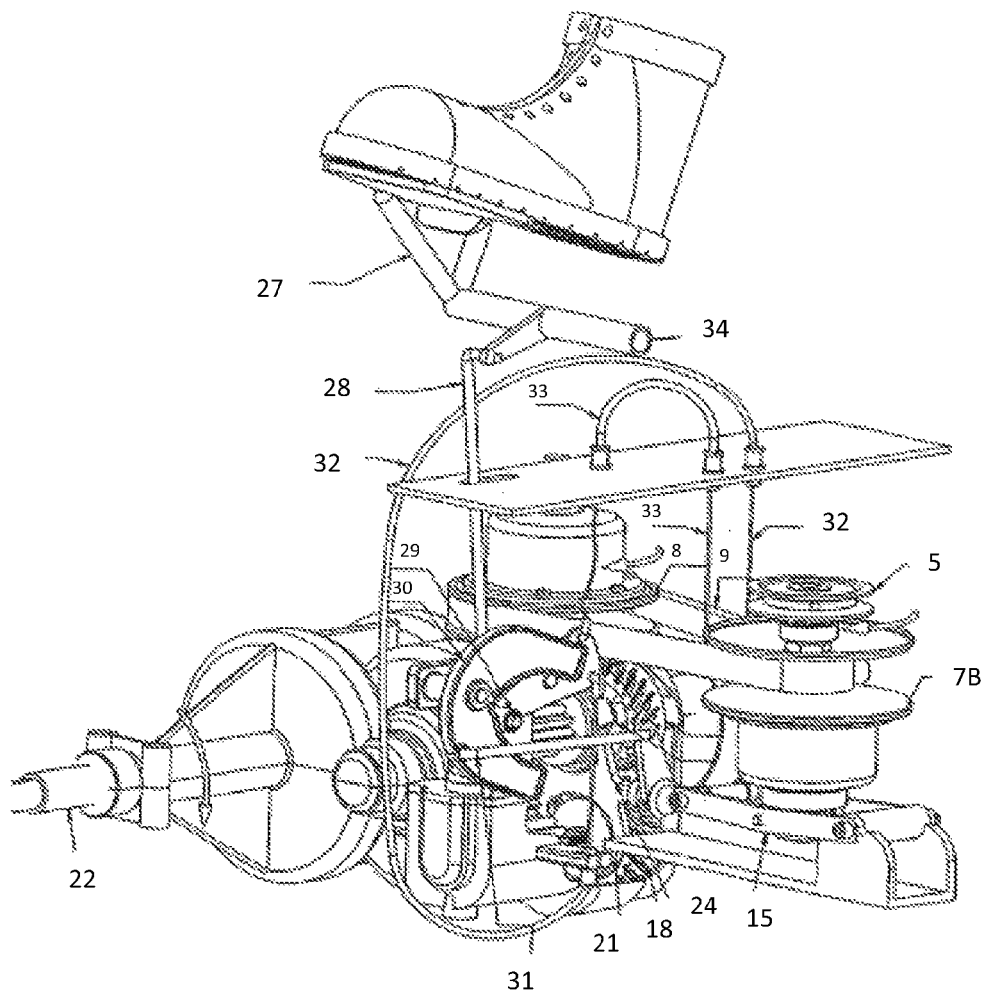
FIG. 3 shows a partial perspective view of a transmission system according to the invention in interlocking position in forward motion of the direction reversal mechanism, and engaged at slow speed of the variable speed drive.
Figure 4:
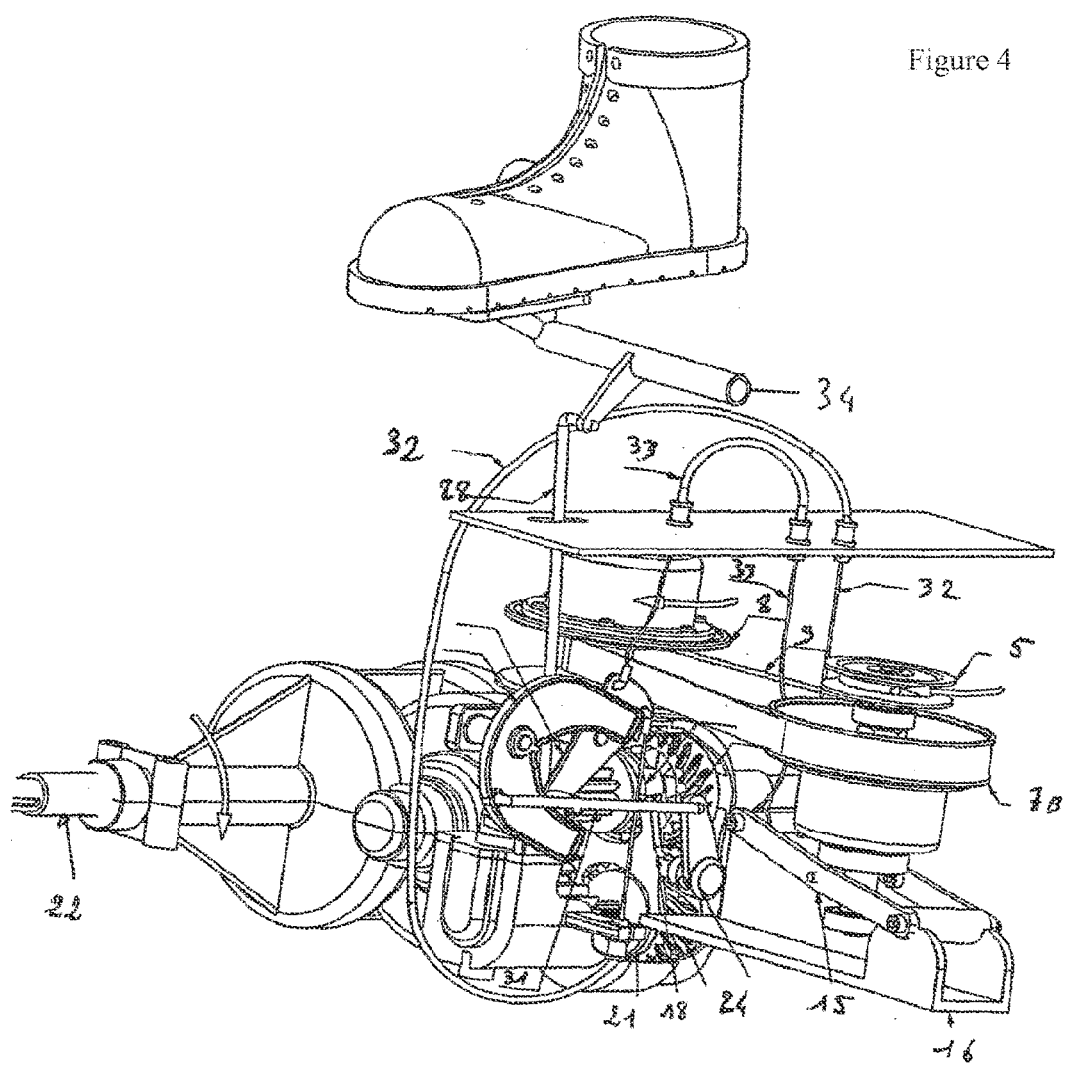
FIG. 4 shows a partial perspective view of a transmission system according to the invention in interlocking position of the direction reversal mechanism and in the engaged position at high speed of the variable speed drive.
Figure 5:
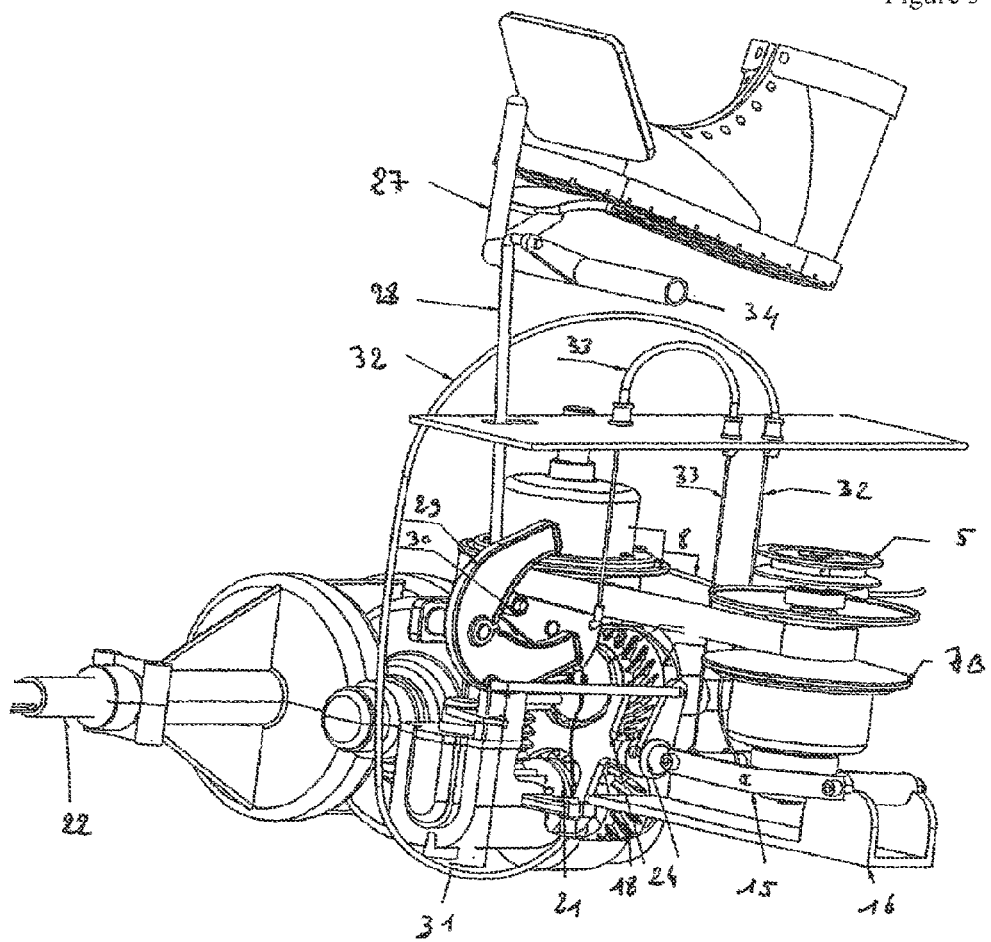
FIG. 5 shows a partial perspective view of a transmission system according to the invention in interlocking position in reverse movement of the reversal mechanism, the variable speed drive being in the disengaged position.
Figure 6:
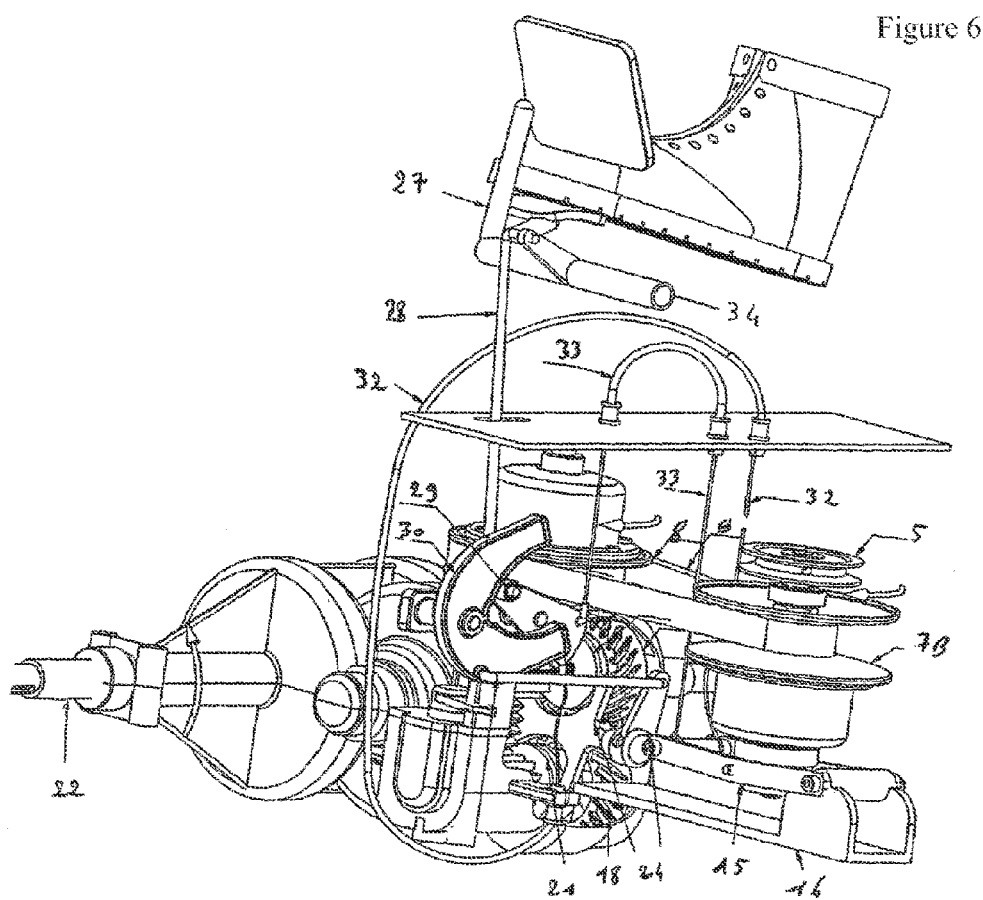
FIG. 6 shows a partial perspective view of a transmission system according to the invention in the interlocking position in reverse movement of the reversal mechanism and engaged at slow speed of the variable speed drive.
Figure 7:
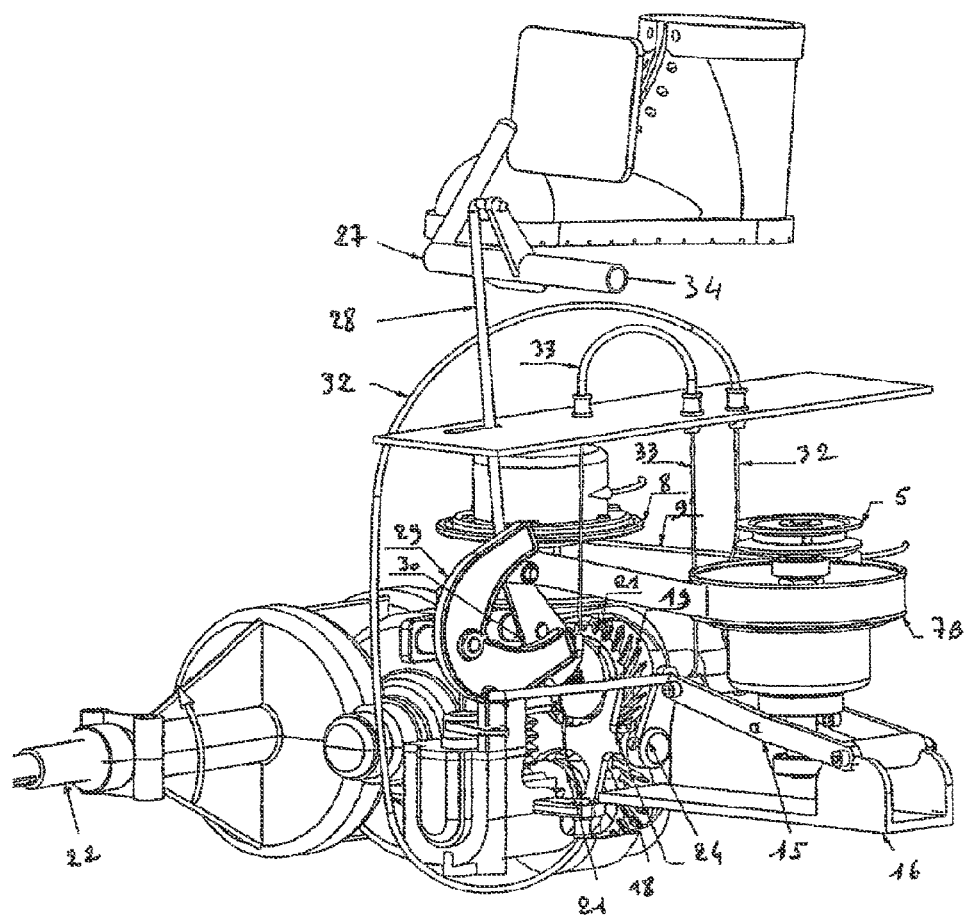
FIG. 7 shows a partial perspective view of a transmission system according to the invention in the interlocking position in reverse movement of the reversal mechanism and in the engaged position at high speed of the variable speed drive.
Figure 13:
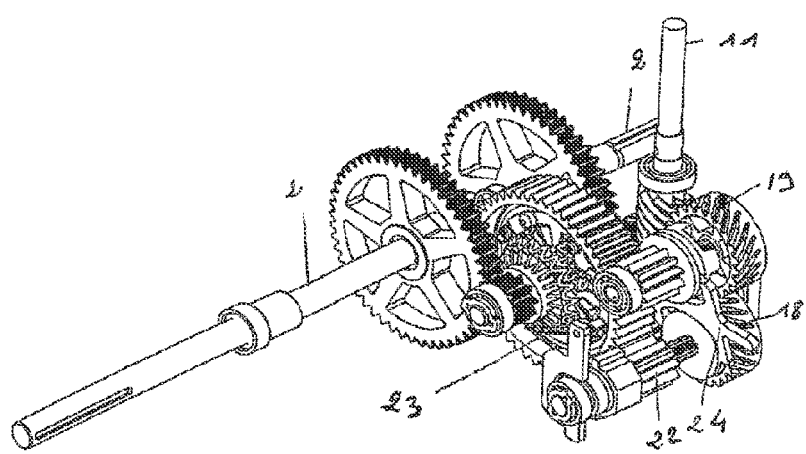
FIG. 13 shows a partial perspective view of the reversal mechanism connected to the wheel drive shaft of the vehicle.
Figure 14:
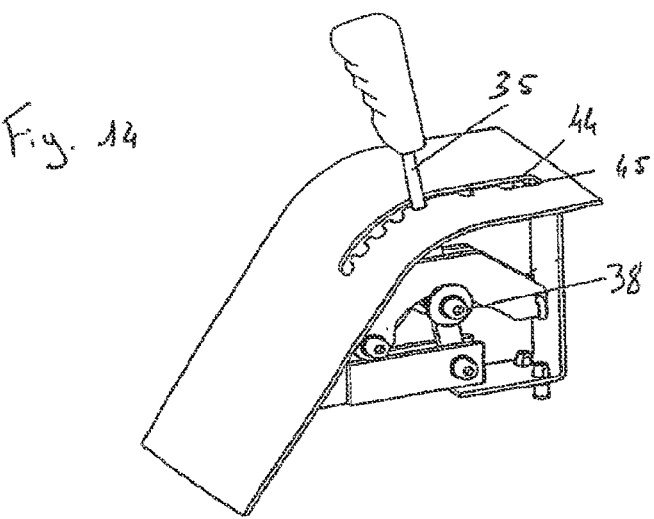
FIG. 14 shows a partial view of another embodiment of a control device of a transmission system according to the invention.
Figure 15:
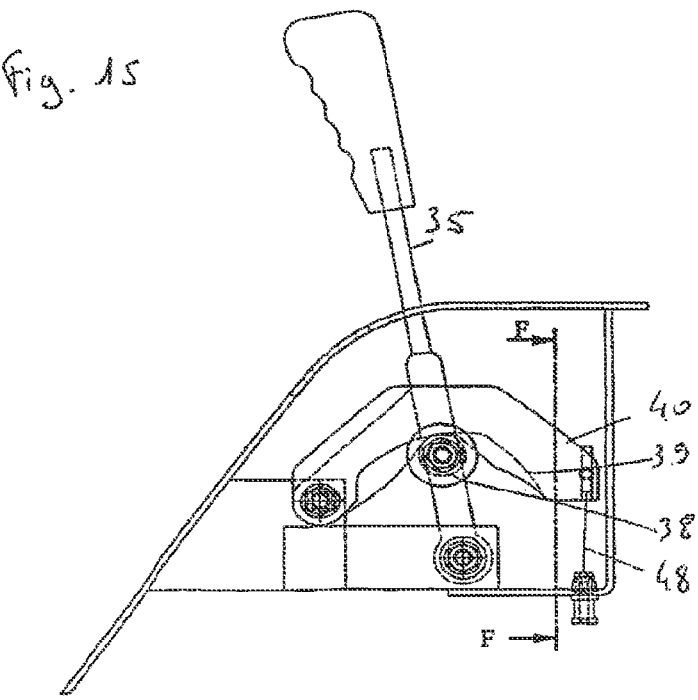
FIG. 15 shows a front view of the device from FIG. 14.
Figure 16:
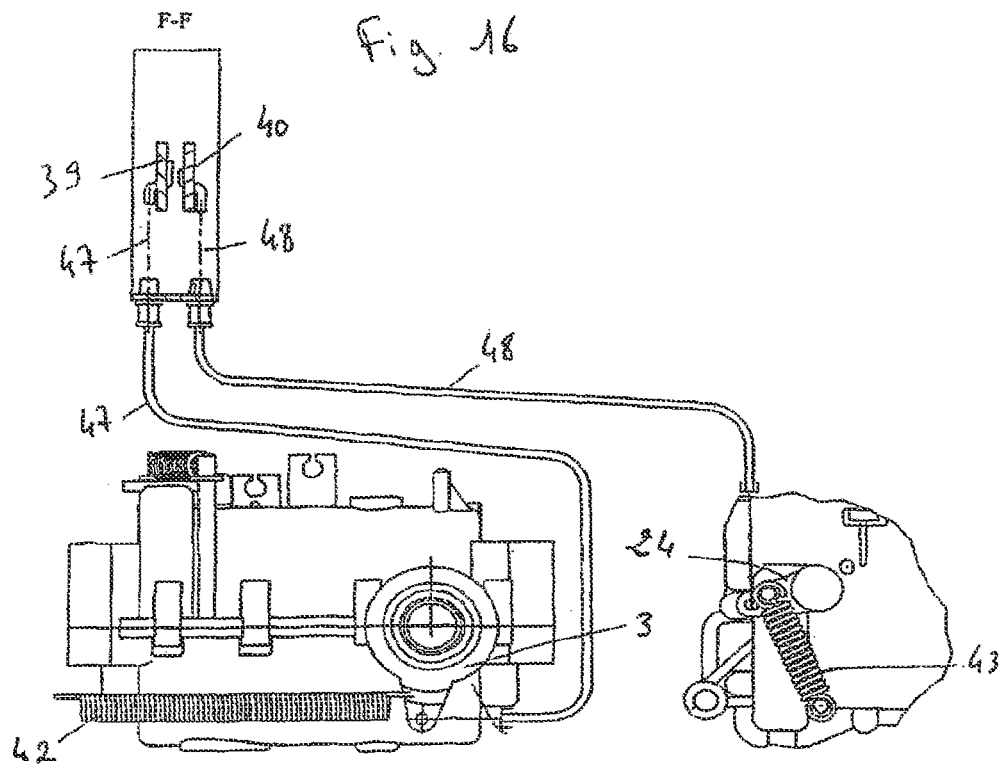
FIG. 16 shows a cutaway view along F-F from FIG. 15, the linkage to the variable speed drive and to the reversing gear having been shown.

The transmission of the motion of the shaft 22 or 23 to the wheel drive shaft 2, shown in FIG. 3, can take place via a gear system of the type of the one shown in FIG. 13. Likewise, a differential can be installed at the level of the connection between the vehicle drive shaft that bears the toothed wheel and the wheel drive shaft 2 of the vehicle. This shaft 2 can, moreover, be composed of two half-shafts, each half-shaft bearing one wheel of the vehicle, especially in the case in which a differential is present.

In the examples described above, the control device 27, shared by the variable speed drive 3 and the reversal mechanism 17, acts, at the same time, successively or synchronized, on the control device 15 of the variable speed drive 3 that has been returned to the disengaged position, for example under the action of its own weight, and on the control device 24 of the reversal mechanism 7, whereby the control device 24 of the reversal mechanism 7 can be activated so as to allow reversal of the direction of travel of the vehicle solely when the speed changing control element 15 is in the disengaged position of said variable speed drive 3. Thus, the control device 27, such as a pedal that is shared by the variable speed drive 3 and the reversal mechanism 17, is an element that can be moved angularly from a first position, said neutral position, either in a first direction in which it acts on the control device 24 of the direction reversal mechanism 17 and on the control device 15 of the variable speed drive 3 so as to allow, first of all, the movement of the direction reversal control device 24 of the reversal mechanism 17 into the forward travel position, then, second, the passage of the speed changing control device 15 from the disengaged position into an engaged position depending on the selected travel speed, or in a second direction in which it acts on the control device 24 of the direction reversal mechanism 17 and on the speed changing control device 15 in such a way as to allow, first of all, the movement of the direction reversal control device 24 into the reverse travel position, then, second, the passage of the speed changing control device 15 from the disengaged position into an engaged position, depending on the selected speed at which the vehicle backs up.

To obtain these different modes of cooperation between the shared control device 27, the control device 15 of the variable speed drive and the control device 24 of the direction reversal control mechanism 17, control devices that can be moved angularly are used in each case.

One example of such kinematics is provided in FIGS. 1 to 6. In this particular embodiment, the control device 27 that is shared by the variable speed drive 3 and the direction reversal mechanism 17 is connected by a motion transmission element 29, such as a rod, to a pivoting lever 29, itself connected by at least two cables 32, 33 to the speed changing control device 15, this pivoting lever 29, during its angular movement, driving the rotational movement of a pivoting cam 30 coupled by elements such as rod 31, link, to the direction reversal control device 24 so as to induce, during movement of the shared control device 27, first of all, parallel to the movement of the pivoting lever 29, the movement of the rotary cam 30 and of the direction reversal control device 24 in a direction corresponding to the forward travel or reverse travel respectively of the vehicle, then, second, the tracking of the movement of the pivoting lever 29 that can cause, by the tension of the cables 32, 33 between lever 29 and the speed changing control device 15, the movement of said speed changing device 15 in the direction of an increase of speed after passing from the disengaged position into the engaged position.

Figure 2:
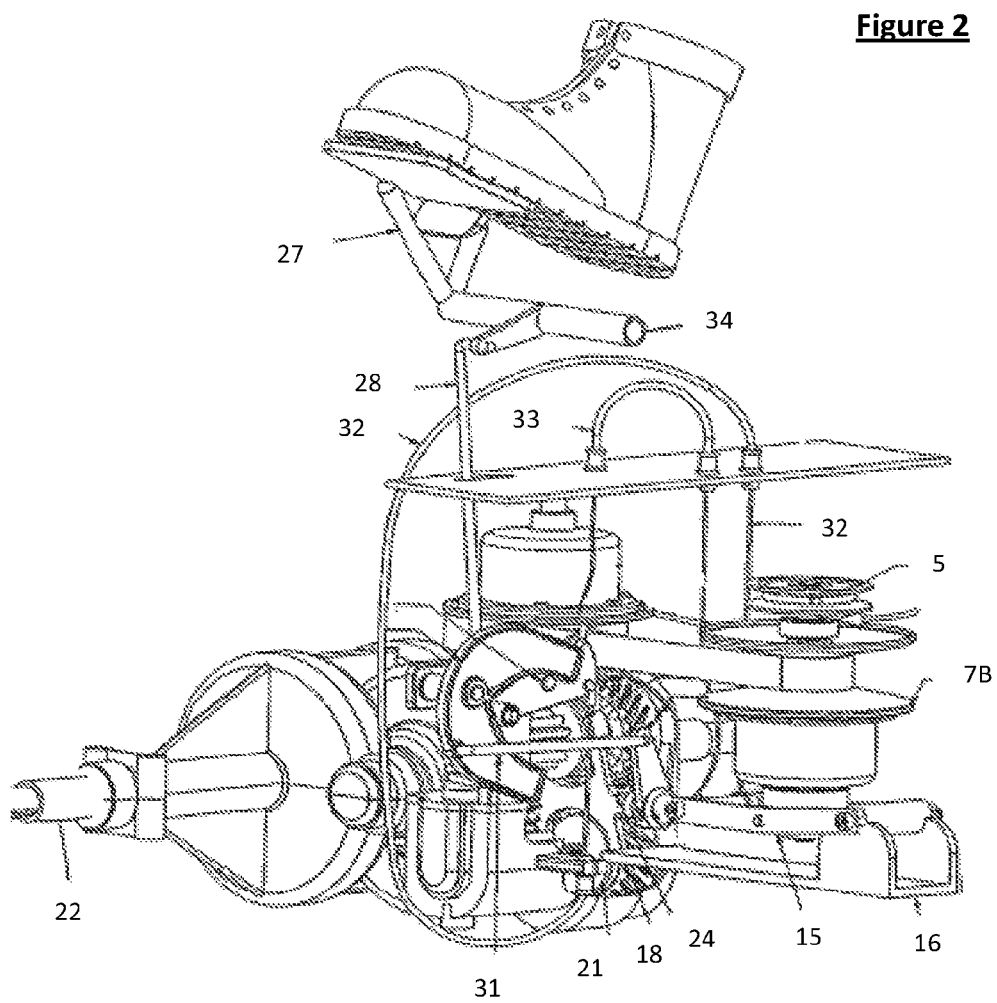
FIG. 2 shows a partial perspective view of a transmission system according to the invention, one part of the housing having been removed, in interlocking position in forward motion of the direction reversal mechanism, the variable speed drive being in the disengaged position.

Thus, in FIG. 1, the shared control device 27 that comprises a selector level is composed of a foot pedal moved via the foot of the operator in the direction of depressing said pedal. This foot pedal is made in the form of a pivoting lever with two prongs. This movement of said pedal via the rod 28 extending between the pedal and the pivoting lever 29 causes rotational motion of a rotary cam 30 around its pivoting axis, as FIG. 2 illustrates. This angular motion of the cam via a rod 31 that connects the cam to the direction reversal control lever 24 of the vehicle causes the movement of said lever in the direction of engagement of the positive clutch 20 with the toothed wheel 18, and consequently a transmission of the motion of the toothed wheel 18 to a shaft 22 that bears the toothed wheel in the direction of driving the vehicle in forward travel. The tracking of the foot-controlled depression of the pedal by the operator causes tracking of the movement of the pivoting level 19 that is connected via a cable to the speed changing device 15 of the variable speed drive. The tracking of the movement of the pedal thus produces tension on said cable and movement of the control device 15 in the direction in which the flanges of the pulley 7 move toward one another to allow, first of all, the passage from the disengaged position into the engaged position of said variable speed drive by covering the roller 14 by the flange 7B, then, during the tracking of the movement of the flange 7B in the direction in which the other flange of the pulley 7 moves closer, an increase in the turning diameter at the level of the drive pulley 7 that is accompanied in parallel by a reduction of the turning diameter of the belt 9 at the level of the driven pulley 8, this reduction in the turning diameter leading to an increase in the speed of rotational driving of the shaft 11 comprising the input shaft of the direction reversal mechanism, and, consequently, an increase in speed. Obviously, the operator relaxing his foot on the pedal causes the reverse movement of said lever and cam and consequently, at first, a speed reduction, then disengaging of the variable speed drive before moving the control lever 24 of the direction reversal mechanism into a neutral position of said direction reversal mechanism. This neutral position allows in particular movement of said self-propelled vehicle by hand, especially in case of vehicle breakdown, the engine being stopped.

Quite obviously, to move the vehicle in reverse, the foot of the operator acts, on the constituent pedal of the control device 27 shared by the variable speed drive and the direction reversal mechanism, in the opposite direction in order to act first of all on the rotary cam and to cause its movement in a direction that is the reverse of that just described above, before acting in an equivalent manner on the tension of the cable of another cable series connecting the pivoting lever 29 to the speed changing control device 15 in the direction of an increase of said speed. The cables that connect the pivoting lever 29 and the speed reversal control device 15 are fixed each time on one of their two ends at two opposite points of said pivoting lever 29.

Due to the fact that by using a single, common control device 27, it is possible to act at the same time on the direction reversal control of the vehicle and on the speed changing control of the vehicle, any risk of mishandling by the operator can be avoided, the latter having only a single control device to actuate. Moreover, because the direction reversal control is automatically controlled in a position in which the variable speed drive is in the disengaged position, any risk of travel with jerking of the vehicle is prevented. It is likewise possible for this reason to use a clutch mechanism of the nonprogressive type that thus allows a reduction in the cost of such a transmission.

At this point, two other control devices will be described in conjunction with FIGS. 14 to 26. Such control device will be used again for a transmission system comprising a variable speed drive composed of a belt transmission. The speed is changed by the flanges of one of the pulleys being moved toward one another or apart from one another in a controlled manner, generally the one carried by the input shaft of a reducing mechanism of a housing integrating the direction reversal and reducing mechanism. In the example shown, the housing bears a pulley, of which one of the flanges is provided with a radial lug that is used for locking one motion transmission element of the cable type that will be described below. This pulley flange that can be moved toward or away from the other flange is returned to a predetermined position via a spring 42. The predetermined position corresponds to the minimum speed of the vehicle.

This transmission system again comprises a reversing gear of the direction of rotation of the output shaft. In the examples shown, reversal is obtained from the angular movement of a control device, such as a fork. This fork can be moved angularly via a motion transmission element composed of a cable mechanism labeled 48 in the figures. This fork is returned into a predetermined position corresponding to the position of forward travel of the vehicle by a spring labeled 43 in the figures.

Characteristically, this control device that acts by at least one motion transmission element, in this instance the cable mechanism 47, 48 described above, on the one hand on the reversing gear control device, on the other hand on the control device of the variable speed drive, comes in the form of a single selector lever 35, with manual control. This selector lever 35 can act at the same time on the change in speed and on the direction of travel of the vehicle to simplify the driving of the vehicle by the user.

Two embodiments of such a control device have been shown.

In a first embodiment according to FIGS. 22 to 26, the selector lever 35 is a lever that pivots around a first axis 36 to control the change of speed and around a second axis 37 to control the reversal of direction. The first and second axes 36, 37 are orthogonal to one another. Thus, the selector lever 35 includes a lever carrying at least one profiled surface 38, such as a roller, which is designed to work with a lever cam 39 that is able to transmit its motion to the variable speed drive during driving to move the lever mounted on a support 41 pivotally around said first axis 36. Support 41 and lever 35 form an assembly that is mounted to rotate around a second axis 37, this assembly being able to transmit its motion to the reversing gear.

The selector lever 35 runs in a guide path 44 with indexing positions formed by notches 45 located on the path of said lever. It is thus possible to fix the lever in any of the positions.

A flexible motion transmission element of the cable 37, 38 type or a rigid motion transmission element of the rod type is, moreover, provided between each lever cam 39, 40 or the support 41/lever 35 assembly and the control device of the reversing gear or of the variable speed drive. A tension spring 42, 43 that tries to return the selector lever 35 to the neutral position of minimum speed is likewise provided each time on the path of the motion transmission elements 47, 48. This selector lever can thus be moved from a neutral position in a first direction in which it controls the change in speed in forward travel of the vehicle, and in a second direction in which it controls the change in speed in reverse travel. The change of direction is controlled in the neutral position. Actually, the guide path 44 is formed by two parts of the guide path with notches 45 and at least one part 46 of the guide path without notches that is positioned preferably between said parts with notches. This part 46 of the guide path without notches corresponds to the zone in which the lever occupies a neutral position of minimum speed and controls the reversal of direction. This guide path is arranged in a plate that is integral with the handlebars or steering wheel of the vehicle. The selector lever 35 projects across this guide path and is mounted pivotally around an axis 36 on a support labeled 41 in the figures. The axis of this lever bears a roller that is mounted so as to be able to rotate freely and that is designed to comprise the profiled contact surface 38 of the selector lever that can work with a lever cam 39. This lever cam 39 is itself pivotally mounted on the support 41. The movement of the lever within its guide path 44 allows generation of cam motion by cooperation of the roller 38 and the cam path delineated by the profile of the lever cam, depending on the position of the lever. This cam is itself connected via a cable to the speed changing control device, in this instance the flange 47 of the speed-changing pulley. Thus, when the lever is moved to the right in FIG. 22, in the direction of the end zone of the guide path 44, it allows the vehicle to travel in reverse while increasing the speed, whereas when it is moved to the left in FIG. 22, it makes it possible to increase the speed of the vehicle traveling forward.

This assembly formed by the lever 35, the lever cam 39 and the support 41 is again mounted pivotally around an axis 37 orthogonally to the pivoting axis 36 of the lever on the support 41. Thus, in the part of the guide path without notches that is labeled 46 in FIG. 22, the pivoting motion of the assembly composed of the support 41, the lever cam and the lever drives a movement of the cable 48 connecting this assembly to the direction reversal control device. Thus, the result is reversal of the direction of rotational driving of the output shaft of the vehicle.

Due to the presence of the guide path 44, it thus becomes extremely easy for the operator of the vehicle to pass from forward travel to travel in reverse and to choose the traveling speed of the vehicle. It should be noted that the axis 37, around which the assembly formed by the support 41 of the lever 35 and the lever cam 39 pivots, is itself housed within a stirrup that is used as the bearing of the axis. This stirrup is itself integral with the chassis of the vehicle.

Such an assembly can therefore be installed with great ease. The lever 35 is in fact provided with a handle that can generally be unscrewed. Consequently, the assembly formed by the support 41, the cam lever 39, the lever 35 without a handle, the axis 37 and the support yoke of this assembly can be preassembled, then mounted on the chassis of the vehicle. It is then sufficient during this installation to insert the axis of the lever into the interior of the guide path 44 that has been previously delineated in the vicinity of the handlebars or steering wheel of the vehicle, then to reposition the handle on the lever 35 by screwing to complete the installation of the assembly.

In another embodiment of the invention shown in FIGS. 14 to 21, the guide path 44 is made in the form of a linear path. In this case, the selector lever comprises a generally pivoting lever that bears at least one profiled contact surface 38 that is designed to work with two lever cams 39, 40 with a distinct profile that are able to transmit their motion, the one labeled 39 in the figures, to the variable speed drive, the other 40 to the reversing gear, in this instance each time to the control device of the variable speed drive or to the reversing gear control device. Again, the profiled contact surface 38 of the selector lever 35 is formed by a roller. The lever cams 39, 40 can be rotationally mounted around the same axis. Again, a flexible motion transmission element of the cable type, labeled 47, 48 in the figures, can be provided between each lever cam 39, 40 and the reversing gear or speed drive control device. A rigid motion transmission element of the rod type could be adapted in an equivalent manner. Again, a tension spring 42, 43 that tries to return selector lever 35 to the neutral position of minimum speed is likewise provided on the path of the motion transmission elements 47, 48 every time. Thus, this selector lever can be moved from a neutral position in a first direction in which it controls the change in speed in forward travel of the vehicle, and in a second direction in which it controls the reversal of direction and the change of speed. This selector lever 35 runs again in a guide path 44 to indexing positions formed by notches 45 located on the path of said lever. It should be noted that the devices performing the same functions as those shown in FIGS. 22 to 26 have been numbered identically. In one embodiment shown, the notches 45 of the guide path 44 can be eliminated and replaced by a friction system positioned, for example, around the pivot axis of the lever, this friction system keeping the lever in any of the positions selected by the operator.

The operation of such a control device is as follows. When the control lever is moved to the left in FIG. 14 out of a neutral position corresponding to an essentially central position of the lever within the guide path 44, it controls the change of speed in forward travel of the vehicle by causing an increase of said speed. This movement of the lever 35 to the left causes rotational driving of the lever cam 39 that is mounted to be able to pivot freely around an axis essentially parallel to the pivoting axis of the lever and consequently transmission of this movement via the cable 47 to the speed changing control device, this cable being fixed on one of its ends directly on the lever cam 39. The profile of the cam is thus chosen to allow an increase in speed as the lever 35 is moved to the left in FIG. 14. When this lever is returned to the neutral position, then moved in the direction of the right in FIG. 14, it then controls, first of all, the reversal of the direction of travel of the vehicle by acting on the lever cam 40, then, second, by action on the lever cam 39, a change in speed in the direction of increasing the speed of the vehicle driven to move in reverse.

Figure 17:
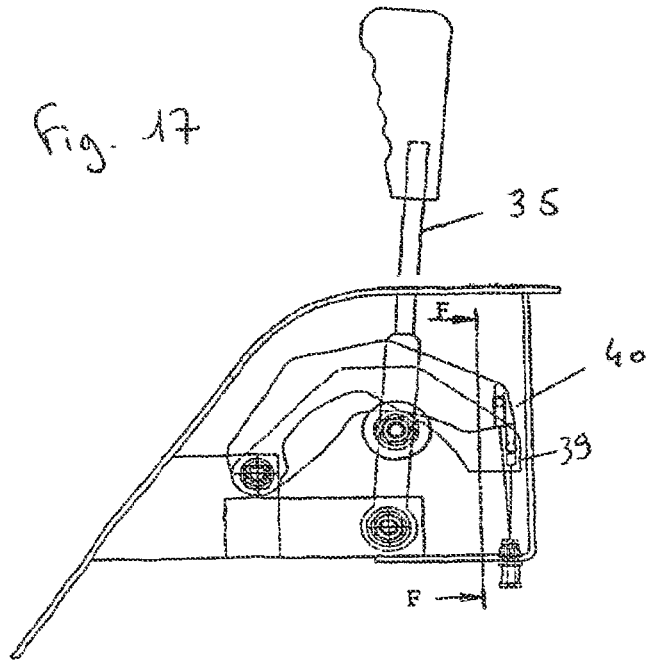
FIG. 17 shows a side view of the device from FIG. 14 in a position in which the lever is in the position for reverse travel at minimum speed.
Figure 20:
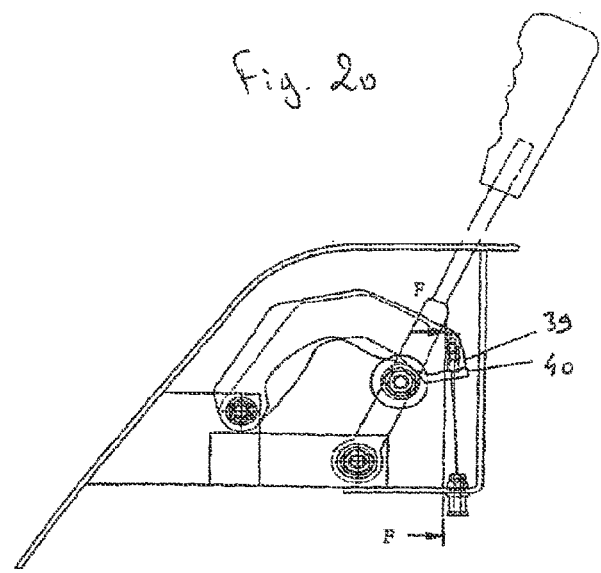
FIG. 20 shows a front view of the control device in a position of the lever corresponding to the reverse travel control at maximum speed of the vehicle.
Figure 21:
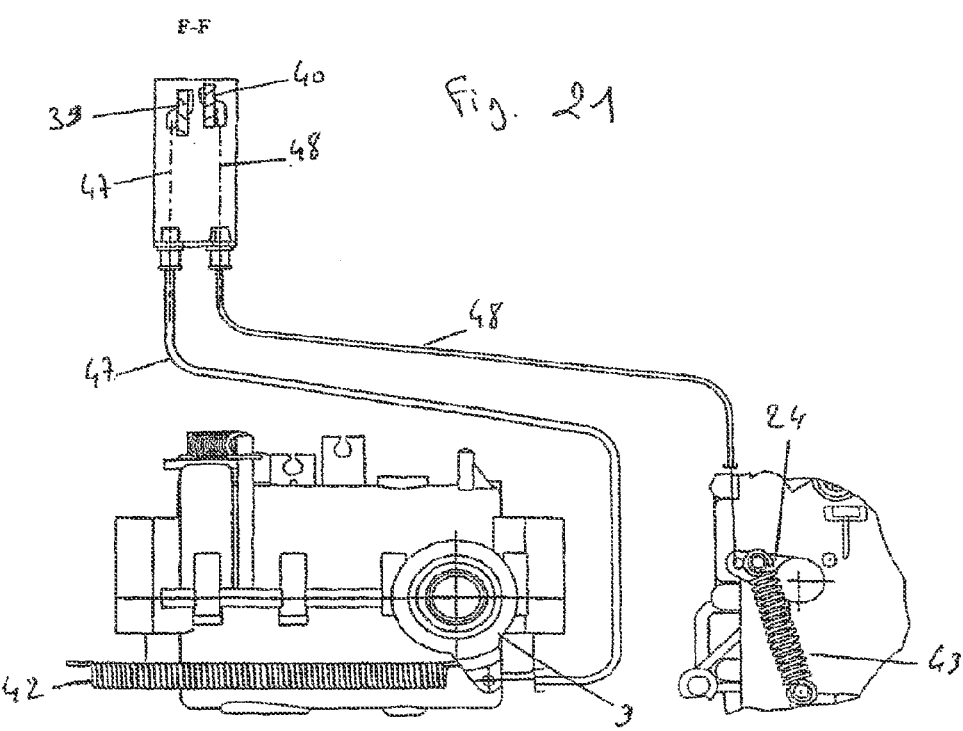
FIG. 21 shows a cutaway view along F-F from FIG. 20, the linkage to the variable speed drive and the reversing gear having been shown.
Figure 22:
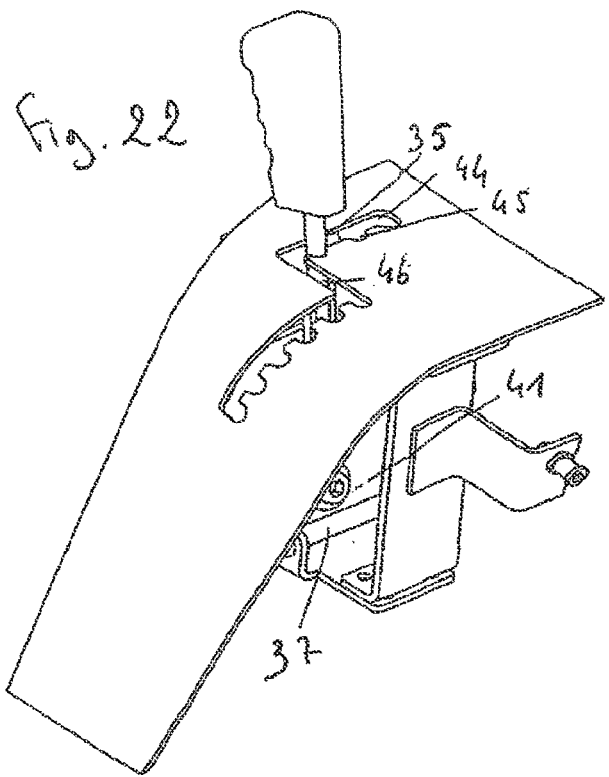
FIG. 22 shows a partial perspective view of another embodiment of a control device according to the invention.
Figure 23:
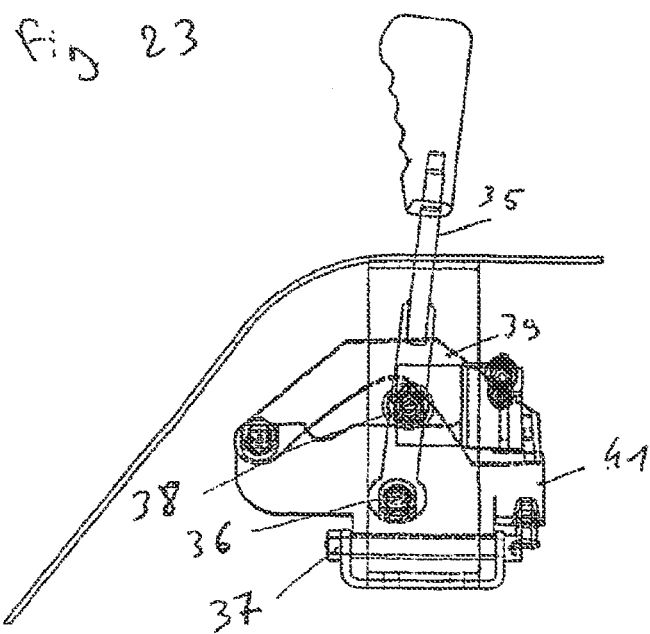
FIG. 23 shows a front view of FIG. 22.
Figure 24:
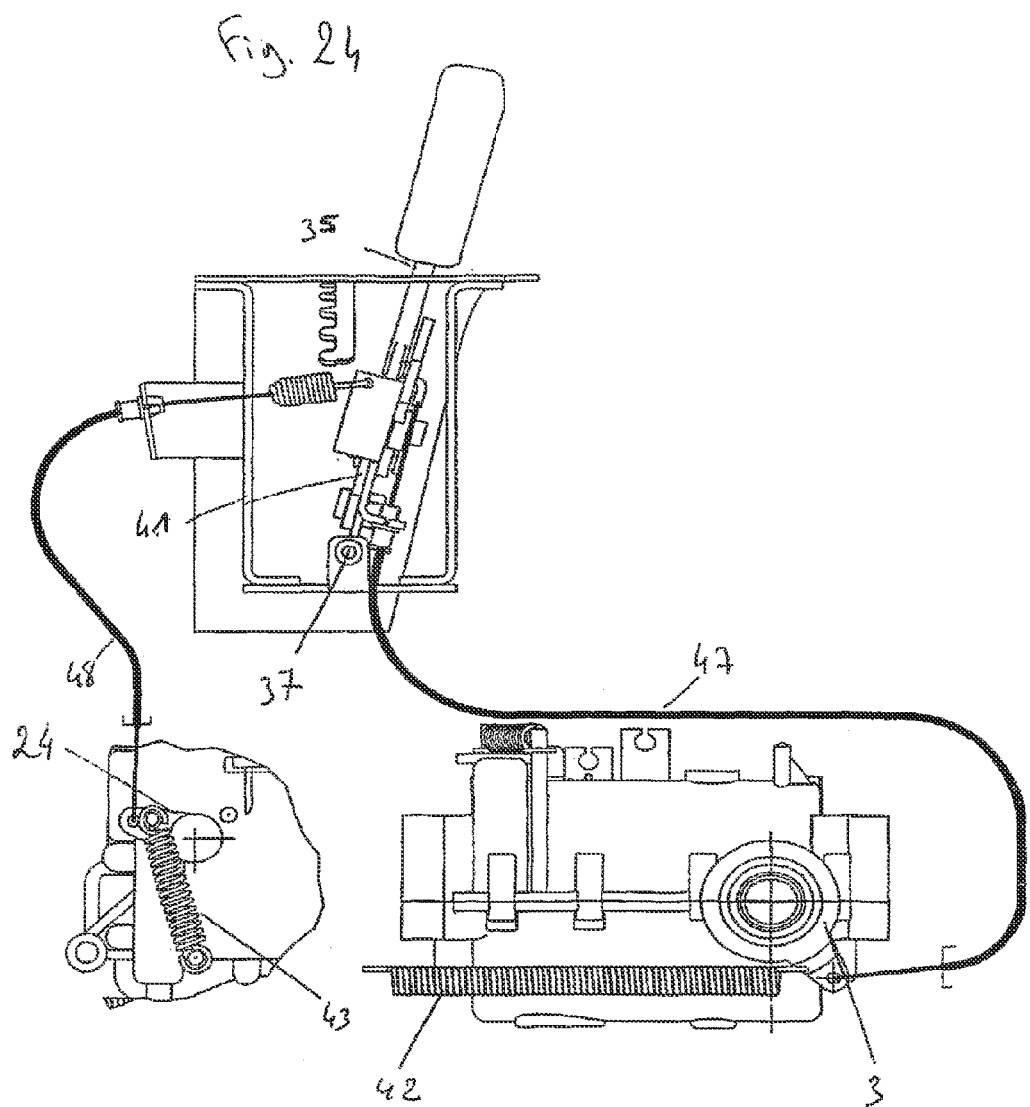
FIG. 24 shows a side view of the device from FIG. 22, the motion transmission elements and the transmission mechanism having been partially shown.
Figure 25:
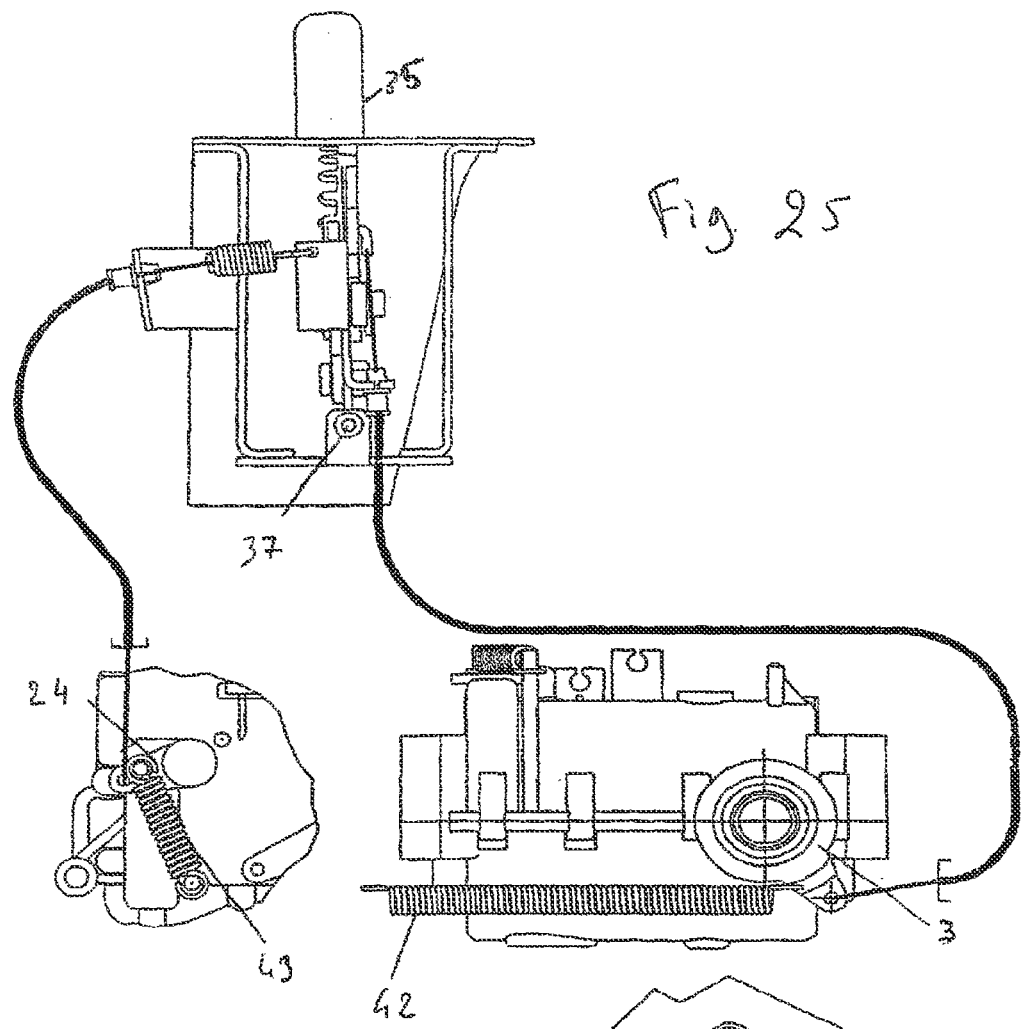
FIG. 25 shows a view similar to FIG. 24 in a position in which the lever occupies a position corresponding to the forward travel of the vehicle at maximum speed.
Figure 26:
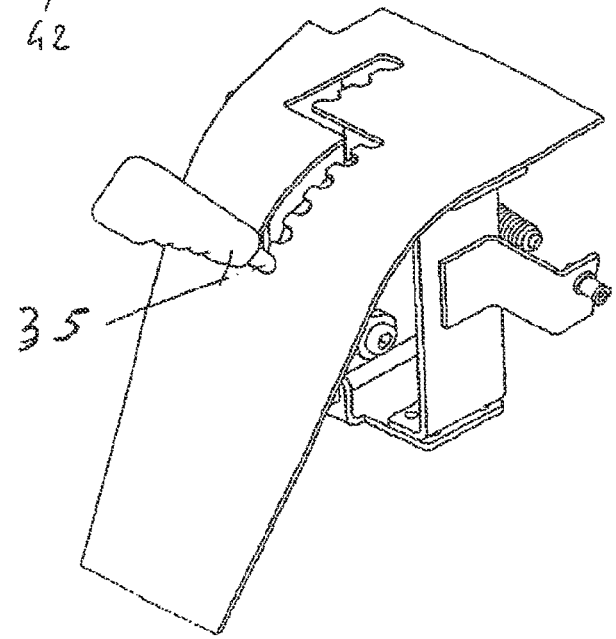
FIG. 26 shows a partial perspective view of the lever in the position corresponding to that shown in FIG. 25.

As FIG. 17 illustrates, during a first phase of movement of the lever, the lever cam 40 is prompted to apply, via a cable 48 connecting the lever cam 40 to the reversing gear control device, an angular movement of the reversing gear control device in the direction of rotationally driving the output shaft of the vehicle in reverse. The tracking of the movement of lever 35 causes parallel displacement of the lever cam 39 that acts similarly on the speed-changing device. Again, the operation of such a lever is thus extremely simple. The lever cams 39, 40 and the lever 35 can be pivotally mounted on a common support. This common support is installed on the vehicle chassis. A guide path 44, within which the axis of the lever 35 projects, is arranged in a plate in the vicinity of the handlebars or steering wheel of the vehicle. Again, the support that bears the assembly of the lever cams and the lever can be positioned on the frame of the vehicle with insertion of the axis of the lever through the arranged guide path 44. The handle is then positioned, especially by screwing, on one end of the lever 35 to ensure complete installation of the assembly. This results in extremely simple installation of the control device on such a vehicle.

The invention claimed is:

1. A three-function transmission system for a self-propelled vehicle with variable travel speed, comprising:
 a primary driving shaft;
 an output shaft;
 a variable speed drive with a belt, a controlled pulley and a driven pulley, flanges of the controlled pulley having a variable gap, the controlled pulley being carried by a corresponding pulley controlled shaft and the driven pulley being carried by a corresponding pulley driven shaft differently from the controlled pulley to the driven pulley, the pulley controlled shaft being fitted with a bearing, roller or ring able to rotate freely on the output shaft, such that the the controlled pulley is configured to be completely disengaged from the belt;
 a controlled reversal mechanism for reversing a direction of travel of the vehicle; and
 at least one three-function mechanical control device of the variable speed drive and the controlled reversal mechanism, the at least one mechanical control device being between the primary driving shaft and the output shaft;
 wherein the primary driving shaft transmits motion via the variable speed drive to an input shaft of the reversal mechanism, the input shaft being able to engage with the output shaft, in such a way as to allow the vehicle to travel forward or in reverse respectively, at a variable travel speed in at least one direction of travel, the variable speed drive and the reversal mechanism for reversing the direction of travel of the vehicle being controlled selectively from the mechanical control device,
 and the mechanical control device is configured to move angularly from a neutral position, either in a first direction in which the mechanical control device acts on a mechanical control device of the reversal mechanism and on the mechanical control device of the variable speed drive so as to allow, first of all, movement of the mechanical control device of the reversal mechanism into a forward travel position, then, second, a passage of the mechanical control device of the variable speed drive from a disengaged position into an engaged position depending on a selected travel speed, or in a second direction opposite to the first direction in which it acts on the mechanical control device of the reversal mechanism and on the mechanical control device of the variable speed drive in such a way as to allow, first of all, the movement of the mechanical control device of the reversal mechanism into a reverse travel position, then, second, a passage of the mechanical control device of the variable speed drive from the disengaged position into the engaged position, depending on a selected speed at which the vehicle backs up.

2. The transmission system according to claim 1, wherein the variable speed drive is controlled in operation by the mechanical control device of the variable speed drive that includes at least one disengaged position in which any transmission of motion from the controlled pulley shaft to the pulley driven shaft is prevented, so as to ensure reversal of the direction of travel of the vehicle without jerking when the variable speed drive is in the disengaged position.

3. The transmission system according to claim 2, wherein the mechanical control device acts at a same time, in a successive or synchronized manner, on the control device of the variable speed drive that has been returned to the disengaged position, and on the mechanical control device of the reversal mechanism, whereby the mechanical control device of the reversal mechanism can be activated so as to allow reversal of the direction of travel of the vehicle solely when the control device of the variable speed drive is in the disengaged position of said variable speed drive.

4. The transmission system according to claim 2, wherein the flanges of the controlled pulley, being moved toward one another or apart from one another by the mechanical control device of the variable speed drive for changing a speed of said variable speed drive, the mechanical control device of the variable speed drive working with an idle element, said bearing, roller or ring with a surface that is mounted so as to be able to rotate freely on the pulley controlled shaft and around which the belt runs at least partially in a position in which the flanges of the controlled pulley have been moved apart, so as to prevent any transmission of motion between shafts bearing the pulleys, a movable flange of the flanges of the controlled pulley just covering said idle element as the flanges of said pulley are moved together in order to allow the belt to run within a groove provided by the flanges and to enable the variable speed drive to pass from the disengaged position to the engaged position, a tracking of the movement of the flanges of the controlled pulley toward one another allowing the speed to be changed at will.

5. The transmission system according to claim 2, wherein the driven pulley, of which flanges are controlled as they are moved together or apart by the control device of the variable speed drive, is the driven pulley of said variable speed drive.

6. The transmission system according to claim 2, wherein the mechanical control device is connected by a motion transmission element, to a pivoting lever, the pivoting lever being connected by at least two cables to the control device of the variable speed drive, this motion transmission element during its angular movement driving the rotational movement of a rotary cam coupled by elements selected from a rod or link to the direction control device, so as to induce during movement of the mechanical control device, first of all, parallel to the movement of the pivoting lever, the movement of the rotary cam and of the mechanical control device of the reversal mechanism in the direction corresponding to forward travel or reverse travel respectively of the vehicle, then, second, the tracking of the movement of the pivoting lever that can cause, by tension of the cables between the pivoting lever and the mechanical control device of the variable speed drive, a movement of said mechanical control device of the variable speed drive within the framework of an increase of speed after passing from the disengaged position into the engaged position.

7. The transmission system according to claim 1, wherein the mechanical control device of the variable speed drive and the mechanical control device of the reversal mechanism are control devices that can move angularly each time.

8. The transmission system according to claim 1, wherein the reversal mechanism comprises at least two counter-rotating toothed wheels or drive gears that are accommodated within a housing and that engage a reversal mechanism shaft of said reversal mechanism, each wheel or drive gear being mounted to be able to rotate freely on the reversal mechanism shaft, said output shaft of the vehicle in forward travel and/or reverse travel of said vehicle respectively, and being able to be coupled to said output shaft via a clutch mechanism that can pass from a disengaged position into an engaged position under action of a mechanical control device comprising the mechanical control device of the reversal mechanism.

9. The transmission system according to claim 8, wherein the clutch mechanism between the shaft and the toothed wheel is a nonprogressive clutch mechanism, with a positive clutch, shared by said wheels or differentiated for each wheel.

10. The transmission system according to claim 8, wherein the mechanical control device of the reversal mechanism has a form of a fork comprising two sets of teeth that each, depending on an angular position assumed by the fork, work with the clutch mechanism to allow the clutch mechanism to pass from the disengaged position to the engaged position and vice versa, these sets of teeth being shaped to act asynchronously on the corresponding clutch mechanism.

11. The transmission system according to claim 1, wherein the mechanical control device is a lever that pivots around a first axis to control the change of speed and around a second axis to control the reversal of direction.

12. The transmission system according to claim 11, wherein the mechanical control device is a generally pivoting lever that bears at least one profiled contact surface that is designed to work with two lever cams with a distinct profile that are able to transmit their motion, one to the variable speed drive, the other to the reversing gear.

13. A control device of a transmission system consistent with claim 1, this system comprising at least, between the driving shaft and the output shaft, a wheel shaft or a tool shaft, on one hand the variable speed drive formed by a belt transmission, the speed being changed by flanges of one of the pulleys being moved toward one another or apart from one another in a controlled manner, on the other hand the reversal mechanism of a direction of rotation of the output shaft, the reversal being obtained as a result of generally angular movement of the mechanical control device, wherein the mechanical control device comes in the form of a single selector lever with manual control, whereby this lever that is mounted to be able to pivot around at least one axis acts by at least one motion transmission element, on one hand on the mechanical control device of the reversal mechanism, on an other hand on the mechanical control device of the variable speed drive, in order to simplify the driving of the vehicle by the user.

14. The control device according to claim 13, wherein the selector lever is a lever that pivots around a first axis to control the change of speed and around a second axis to control the reversal of direction.

15. The control device according to claim 14, wherein the first and second axes are orthogonal to one another.

16. The control device according to claim 14, wherein the selector lever includes a lever having at least one profiled surface that is configured to work with a lever cam that is configured to transmit its motion to the variable speed drive during driving to move the lever mounted on a support pivotally around said first axis, support and lever forming an assembly that is mounted to rotate around a second axis, this assembly being configured to transmit its motion to the reversal mechanism.

17. The control device according to claim 16, wherein the profiled surface of the selector lever is formed by a roller.

18. The control device according to claim 16, wherein there are two lever cams, and a flexible motion transmission element of a cable or a rigid motion transmission element of a rod is provided between each of the two lever cams or the support/lever assembly and the mechanical control device of the reversal mechanism or of the variable speed drive.

19. The control device according to claim 13, wherein the selector lever comprises a generally pivoting lever that bears at least one profiled contact surface that is configured to work with two lever cams with distinct profiles that are configured to transmit their motion, one lever cam to the variable speed drive, the other lever cam to the reversal mechanism.

20. The control device according to claim 13, wherein a tension spring that is adapted to return selector lever to a neutral position of minimum speed is provided each time on a path of the motion transmission elements.

21. The control device according to claim 13, wherein the selector lever can be moved from a neutral position into a first direction in which the selector lever is configured to control the change in speed in forward travel and into a second direction opposite to the first direction in which the selector lever is configured to control the reversal of direction and the change in speed.

22. The control device according to claim 13, wherein the selector lever is configured to run in a guide path to indexing positions formed by notches that are located on a path of said lever.

23. The control device according to claim 22, wherein the guide path is formed from two parts of the guide path with notches and at least one part of the guide path without notches that is positioned between said parts with notches, this part of the guide path without notches corresponding to a zone in which the lever occupies a neutral position of minimum speed and controls the reversal of direction.

24. A self-propelled vehicle with variable travel speed equipped with the transmission system according to claim 1, comprising:
between the primary driving shaft of the vehicle and the output shaft or the wheel drive shaft of the vehicle, at least one said mechanical control device of the variable speed drive with the belt and the reversal mechanism for reversing the direction of travel of the vehicle, the primary driving shaft transmitting via the variable speed drive its motion to the input shaft of the reversal mechanism, the input shaft being able to directly or indirectly engage the output shaft, or the wheel drive shaft of the vehicle, in such a way as to allow movement forward or in reverse respectively.

25. A transmission system having a control device shared by a variable speed drive and a reversal mechanism, comprising:
a mechanical control device wherein movement of the mechanical control device via a foot or hand of an operator in a first direction of depressing said mechanical control device causes, first of all, a movement of a direction reversal mechanical control device of the reversal mechanism into a forward travel position, then, second, passage of a mechanical speed changing control device from a disengaged position into an engaged position depending on a selected travel speed, and moving of the mechanical control device via the foot or hand of the operator in a second direction of depressing said mechanical control device opposite to the first direction causes movement of the direction reversal control device into a reverse travel position, then, second, passage of the mechanical speed changing control device from the disengaged position into the engaged position, depending on the selected speed at which the vehicle backs up,
wherein the mechanical control device is part of the transmission system of claim 1.

26. The transmission system according to claim 25, wherein the mechanical control device is a pivoting lever with two prongs.

27. The transmission system according to claim 25, wherein the mechanical control device is shared by the variable speed drive and the reversal mechanism and is connected by a motion transmission element, to a pivoting lever, the pivoting lever being connected by at least two cables to the mechanical control device of the variable speed drive, this motion transmission element during its angular movement driving the rotational movement of a rotary cam coupled by elements such as rod, link, to the direction control device, so as to induce during movement of the mechanical control device, first of all, parallel to a movement of a pivoting lever, the movement of the rotary cam and of the direction reversal control device of the reversal mechanism in a direction corresponding to forward travel or reverse travel respectively of a vehicle, then, second, the tracking of the movement of the pivoting lever that can cause, by a tension of the cables between the pivoting lever and the mechanical control device of the variable speed drive, a movement of said mechanical control device of the variable speed drive within a framework of an increase of speed after passing from the disengaged position into the engaged position.

* * * * *